US006988268B2

(12) United States Patent
Zuberi

(10) Patent No.: US 6,988,268 B2
(45) Date of Patent: Jan. 17, 2006

(54) IO COMPLETION ARCHITECTURE FOR USER-MODE NETWORKING

(75) Inventor: Khawar M. Zuberi, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 707 days.

(21) Appl. No.: 10/137,589

(22) Filed: Apr. 30, 2002

(65) Prior Publication Data
US 2003/0204552 A1  Oct. 30, 2003

(51) Int. Cl.
G06F 9/46 (2006.01)
G06F 3/00 (2006.01)

(52) U.S. Cl. ............... 718/103; 710/19; 710/20; 710/33; 710/51; 709/219

(58) Field of Classification Search ........... 718/100, 718/102–103; 710/4, 18, 19, 20, 33, 55; 709/219
See application file for complete search history.

(56) References Cited

U.S. PATENT DOCUMENTS

| | | | | |
|---|---|---|---|---|
| 5,758,184 A * | 5/1998 | Lucovsky et al. | ............. | 710/6 |
| 5,778,221 A | 7/1998 | Temple | | |
| 5,835,763 A * | 11/1998 | Klein | ............. | 718/101 |
| 6,065,089 A * | 5/2000 | Hickerson et al. | ............. | 710/266 |
| 6,105,122 A * | 8/2000 | Muller et al. | ............. | 712/1 |
| 6,219,690 B1 | 4/2001 | Slingwine et al. | | |
| 6,223,207 B1 * | 4/2001 | Lucovsky et al. | ............. | 718/107 |
| 6,571,282 B1 * | 5/2003 | Bowman-Amuah | ............. | 709/219 |
| 6,611,882 B1 * | 8/2003 | Schmisseur | ............. | 710/22 |
| 6,658,469 B1 | 12/2003 | Massa et al. | | |
| 6,675,238 B1 * | 1/2004 | Coffman et al. | ............. | 710/46 |
| 6,754,738 B2 * | 6/2004 | Brice et al. | ............. | 710/48 |
| 2001/0051972 A1 | 12/2001 | Eydelman et al. | | |
| 2002/0007420 A1 | 1/2002 | Eydelman et al. | | |
| 2003/0067913 A1 | 4/2003 | Georgiou et al. | | |
| 2003/0140179 A1 | 7/2003 | Wilt et al. | | |

OTHER PUBLICATIONS

"The process-Flow Model: Examining I/O Performance from the System's Point of view", Gregory R. Graner, Yale N. Patt, ACM 1993.*
Modeling and optimizing I/O throughput of multiple disks on a bus, Rakesh barve, et al., ACM 1999.*
Apparna et al., "Monitoring Ethernet Network Activity with NDIS Drivers—Whitepaper," *California Software Laboratories Techguide*, pp. 1-16 (Jan. 1999) printed at http://www.cswl.com/whiteppr/white/ethernet.html.

(Continued)

*Primary Examiner*—Majid Banankhah
(74) *Attorney, Agent, or Firm*—Wolf, Greenfield & Sacks, P.C.

(57) ABSTRACT

A new method and framework for implementing network protocol processing utilizing a combination of application threads and a dedicated thread to process IO completions in a completion queue that automatically detects and adjusts thread priorities to alleviate manual intervention. According to the present invention, as data transfer operations are completed by the network interface, completion information identifying the data transfer operations is posted on the completion queue. The completion information is read and processed by a combination of application and dedicated threads running in the system. A method monitors performance of the system to detect whether poor processor utilization or excessive context switches occurs, in which case a different thread is used to process the completion information. In order to context switch to a different thread, the priority level of the dedicated thread is set to a HIGH level to utilize the dedicated thread or the priority level of the dedicated thread is set a LOW level to utilize an application thread.

31 Claims, 6 Drawing Sheets

OTHER PUBLICATIONS

Bsy, "Virtual Memory," *CSE 30—Lecture 17,* UC San Diego, pp. 1-2 (Nov. 1996) printed at http://www.cs.ucsd.edu/classes/fa96/cse30/lec17/.

Druschel et al., "Lazy Receiver Processing (LRP): A Network Subsystem Architecture for Server Systems," *Proceedings of the 2nd Symposium on Operating Systems Design and Implementation (ODSI ),* pp. 261-275 (Oct. 1996).

Haines et al., "On the Design of Chant: A Talking Threads Package," *Proceedings of Supercomputing '94,* pp. 350-359 (1994).

Madukkarumukumana et al., "Harnessing User-Level Networking Architectures for Distributed Object Computing Over High-Speed Networks," *USENIX Papers,* pp. 1-14 (1998) printed at http://www.usenix.org/publications/library/proceedings/usenix-nt98/full_papers/mad . . . /madukkarum.htm.

Microsoft Corporation, "System Area Networks," *Microsoft Windows Platform Development,* 1 pg (2001) printed at http://www.microsoft.com/hwdev/tech/network/san/default.asp.

Microsoft Corporation, "Winsock Direct and Protocol Offload on SANs," *Windows Platform Design Notes,* pp. 1-8 (2001).

Mogul et al, "Eliminating Receive Livelock in an Interrupt-driven Kernel," *WRL Research Report 95/8,* Digital Western Research Laboratory, pp. 1-46 (1995).

PCAUSA, "Windows Networking Architecture," *RAW Ether for Windows,* pp. 1-4 (2001) printed at www.rawether.net/product/tour01.htm.

Pinkerton, Jim, "Winsock Direct: The Value of System Area Networks," pp. 1-15 (2001) printed at http://microsoft.com/TechNet/itsolutions/network/evaluate/technol/wsockdir.asp?frame-true.

\* cited by examiner

IO COMPLETION ARCHITECTURE FOR USER-MODE NETWORKING

AREA OF THE INVENTION

The present invention generally relates to the area of computer networks and implementation of network protocol stacks. More particularly, the present invention is directed to distribution of protocol load processing by networking stacks in a multiprocessor system and to minimizing context switching and interrupts in both single processor and multiprocessor systems.

BACKGROUND OF THE INVENTION

In multiprocessor systems, multiple processor cycles are leveraged to execute application threads in an effort to minimize context switches and interrupts. Because of the varied and diverse nature of applications running within the multiprocessor system, processors may be over or under utilized resulting in less than optimal efficiency of the overall system. For example, if the network protocol stack is improperly architected, applications such as SQL Server that are affinitized to certain processors in the system may produce more free processor cycles on the affinitized processors as compared to other processors in the system scheduled to execute threads from other applications. Efficient network protocol processing requires the utilization of processor cycles on all processors in the system upon availability, without limitation.

Today's distributed processing architectures endeavor to provide high bandwidth, low latency and reliable transport services to processor intensive applications. One such architecture is a "System Area Network" (SAN), a high-performance, connection-oriented network that can link a cluster of computers. SANs differ from other media, such as Gigabit Ethernet and ATM, because SANs implement functionality directly in hardware. SANs are designed to free up valuable server resources, especially processing cycles, in an effort to provide more resources to applications running on the server.

One significant feature of the SAN is that it supports sending and receiving data directly from or to a user application, thus, bypassing the kernel networking layers. To enable communication directly between user applications and the SAN hardware requires a communications interface. An exemplary communications interface is Microsoft's Winsock Direct, a protocol that integrates server applications into SAN environments. To provide scalable performance, the SAN hardware includes a "completion queue" (CQ) that provides a single monitoring point for completion information relating to data transfer operations. Data transfer operations include both traditional send/receive operations and remote-DMA (RDMA) read/write operations. According to the system, as data transfer operations are completed, a descriptor (referred to as a "CQ completion") that identifies the completed operation is posted on the completion queue by the SAN adapter. To check whether a data transfer operation has completed, applications invoke one of two methods: "enabling interrupts and blocking" and "polling."

In the case of enabling interrupts and blocking, the SAN adapter interrupts the host application/system when a new CQ completion is posted in the completion queue. Essentially, the host application simply waits until the SAN adapter notifies it that a CQ completion has been posted at which time the host application reads the CQ completion in the completion queue. Enabling interrupts and blocking is used in situations where the server is not saturated, that is, the completion queue is often empty. However, for saturated servers having considerable amounts of receive data, this notification process results in poor performance because it requires that the SAN adapter generate an interrupt each time a CQ completion is posted in the completion queue (which is expensive in terms of consuming CPU processing cycles).

Polling requires that a host application awaiting completion of data transfer operations repeatedly check the completion queue for related CQ completions. One way to perform polling requires that the host application use an application thread to monitor the completion queue. Procedurally, the application thread invokes a procedure call, for example a Microsoft Windows® WinSock call, and the network protocol implementation uses (i.e., "hijacks") this thread to check CQ completions in the completion queue. Using application threads to monitor the completion queue results in no interrupts or context switches, thus, benefiting the performance of the system. However, the use of application threads results in poor load balancing because not all application threads invoke procedure calls suitable for hijacking to check the completion queue. This results in only a subset of the threads (running on a subset of the available processors) being used for network processing, thus, allowing some processors to become over-subscribed while others are under-utilized.

Another mechanism for polling the completion queue employs a "dedicated thread" (also referred to as a "private thread") to handle all CQ completions posted to the completion queue. The dedicated thread runs at the same priority as the application threads and continues to process CQ completions until preempted. Preemption occurs at the end of a scheduling quantum (i.e., a time slice) or when the completion queue becomes empty. Upon preemption of the dedicated thread, the application threads run until the dedicated thread is scheduled for execution again at which time more CQ completions can be processed. In the event that no CQ completions are present in the completion queue, the dedicated thread enables interrupts and blocks until additional CQ completions are posted and the host application is notified. While using a dedicated thread is beneficial for limiting interrupts and context switches, the dedicated thread must be aware of the priority level at which the application threads execute in order to operate optimally. For example, if the priority level is set too high, processor cycles for application threads will be limited. If the priority level is set too low, processor cycles for application threads will starve-out the dedicated thread. Moreover, the dedicated thread and application threads will constantly context switch, leading to high overhead.

Traditional load-balancing and interrupt/context switch reduction techniques utilizing application threads and/or a dedicated thread require detailed analysis of the system coupled with manually setting thread priorities and manually affinitizing threads to certain system processors. Because different settings are required for different applications and configurations, detailed performance evaluations are required to provide optimal performance.

SUMMARY OF THE INVENTION

The present invention comprises a new method and framework for implementing network protocol processing. More particularly, the present invention utilizes a combination of application threads and a dedicated thread to process IO completions in a completion queue, and further automatically detects and adjusts thread priorities to alleviate manual intervention. This method and framework ensure that context switches are minimized and processor utilization is properly controlled.

More particularly, a network protocol processing framework embodying the present invention includes a network interface communicably coupled to perform data transfer operations, a completion queue storing completion information for the data transfer operations, an application, an application thread and a dedicated thread. According to the present invention, as data transfer operations are completed by the network interface, completion information identifying the data transfer operations is posted on the completion queue. The completion information is read and processed by a combination of application and dedicated threads running in the system. As a default, application threads are used to process the completion information posted to the completion queue. A method monitors performance of the system to detect whether poor processor utilization or excessive context switches occurs, in which case the dedicated thread is used to process the completion information.

In order to use the dedicated thread, the priority level of the dedicated thread is set to a HIGH priority level and the operating system context switches to the dedicated thread. Setting the priority to the HIGH level prevents application threads from preempting the dedicated thread unnecessarily (i.e., before the dedicated thread is finished doing all its work). The dedicated thread proceeds to process the completion information posted to the completion queue beginning with the first completion information entry in the completion queue. Once the completion queue is empty or a set number of completion entries are processed, the priority level of the dedicated thread is set to a LOW priority level and the operating system context switches to one of the application threads. The network protocol implementation "hijacks" procedure calls made by application threads to check the completion queue for completions. Only a set maximum number of completion entries are processed each time an application thread is hijacked. Different execution conditions (such as all application threads blocking) can lead to the dedicated thread being scheduled again for execution, at which time, the dedicated thread once again sets its priority to HIGH level and resumes processing completion entries.

In one embodiment of the invention, the LOW priority level assigned to the dedicated thread is determined based upon the priority levels of the application threads running in the system. In this embodiment, a sample set of base priorities is determined by analyzing various system calls (such as the WinSock send( ) call) performed by the application threads. If all priorities in the sample are identical, the LOW priority level is set to that identical value. If all priorities in the sample are not the same, the LOW priority level is set to a level representative of a percentile in the sample.

According to the present invention, this framework and method for distribution of network protocol processing is optimized as context switches are made in a controlled manner from thread to thread instead of threads being unnecessarily preempted before completing their work. Also, use of polling results in reduced number of interrupts. Moreover, because the operation system scheduler schedules the dedicated thread for execution on whichever processor has free cycles available, this framework also results in good load balancing in multiprocessor systems.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF ILLUSTRATIVE EMBODIMENTS

In networked computer systems, it is desirable and beneficial if interrupts and context switches related to network communication are minimized such that overall performance of the system is optimized. Moreover, in multiprocessor systems, it is desirable and beneficial if access to processor cycles is maximized amongst applications such that performance of the overall system is optimized. There is a need for a method for systematically determining whether load-balancing of processors in a multiprocessor system is required, and for automatically adjusting thread priorities to effectuate load-balancing of processors, without the use of manual intervention.

Figure 1:
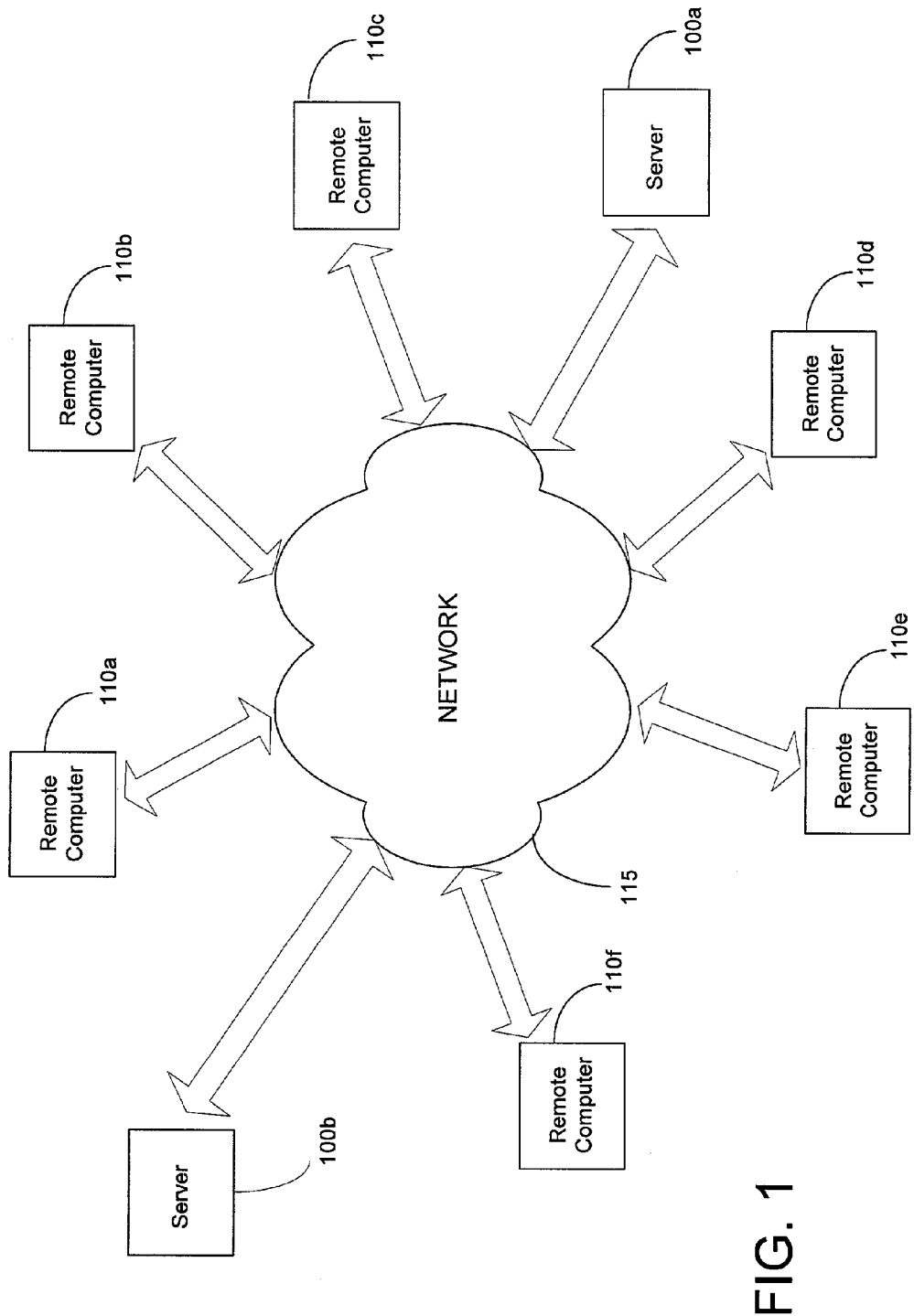
FIG. 1 is a schematic diagram of an exemplary networked computer system in which aspects of the present invention and/or portions thereof may be incorporated.

Turning to the drawings, wherein like reference numerals refer to like elements, the invention is illustrated as being implemented in a suitable computing environment. In an embodiment of the present invention, an IO completion technique comprises application software executed within a networked computer operating environment such as the one depicted in FIG. 1, and in particular one that is configured to support potentially hundreds of thousands of concurrent network connections. Such a computing environment is potentially present in popular website server configurations that exist today. FIG. 1 illustratively depicts an example of a suitable operating environment within which the invention is implemented. The example network includes several remote computers 110a–f communicating with servers 100a–b over a network 115, represented as a cloud. Network 115 includes any of many well-known components, such as routers, gateways, hubs, etc. and allows remote computers 110a–f to communicate via wired and/or wireless media.

The operating environment is only one example of a suitable operating environment and is not intended to suggest any limitation as to the scope of use or functionality of the invention. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

Although not required, the invention is described in the general context of computer-executable instructions, such as program modules, being executed by a system computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
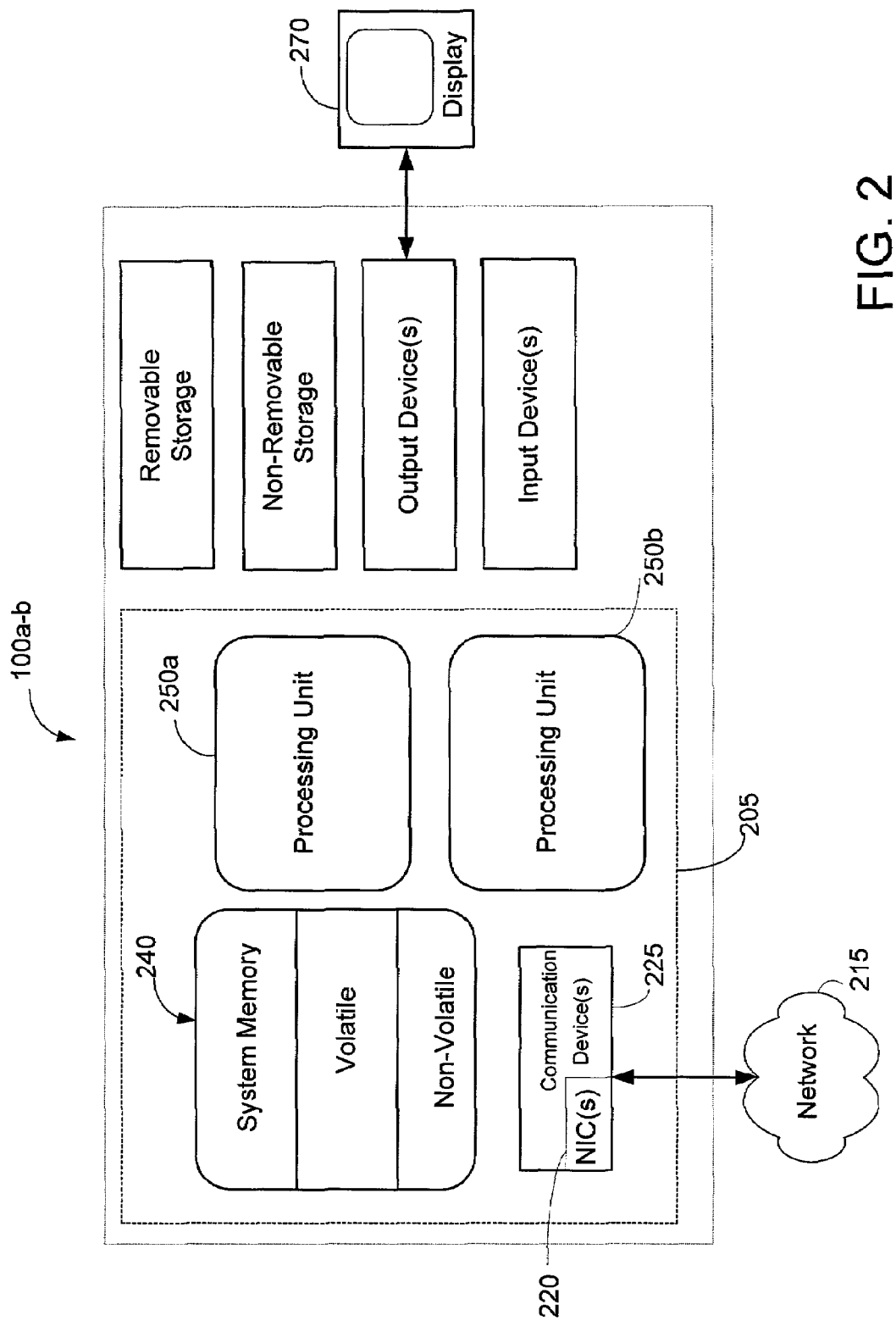
FIG. 2 is a block diagram of a general purpose multiprocessor server in which aspects of the present invention and/or portions thereof may be incorporated.

Referring to FIG. 2, an example of a basic configuration for servers 100a–b on which the invention described herein is implemented is shown. Servers 100a–b comprise any appropriate computer capable of performing network protocol processing. In its most basic configuration, servers 100a–b include one or more processing units 250a–b, communication device(s) 225 and memory 240. Depending on the exact configuration and type of server, the memory 240 may be volatile (such as RAM), non-volatile (such as ROM or flash memory) or some combination of the two. Servers 100a–b also contain communication device(s) 225 that allows the servers 100a–b to communicate with and respond to other remote computers 110a–f via the network. The communication device(s) include a network interface, such as a network interface controller (NIC) 220, coupled to the network 215. Various and multiple NICs are employed in alternative embodiments of the invention including, but not limited to, cards that support Ethernet (802.3), Token Ring (802.5), ARCNET 878.2, Wireless and ATM. Communication device(s) and media typically embody computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media. This most basic configuration is illustrated in FIG. 2 by dashed line 205.

Additionally, the servers 100a–b may also have additional features/functionality. For example, servers 100a–b may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the servers 100a–b. Any such computer storage media may be part of the servers 100a–b. Servers 100a–b may also have input devices such as a keyboard, mouse, pen, voice input device, touch input device, etc. Output devices such as a display 270, speakers, a printer, etc. may also be included. All these devices are well known in the art and need not be discussed at length here.

Figure 3:
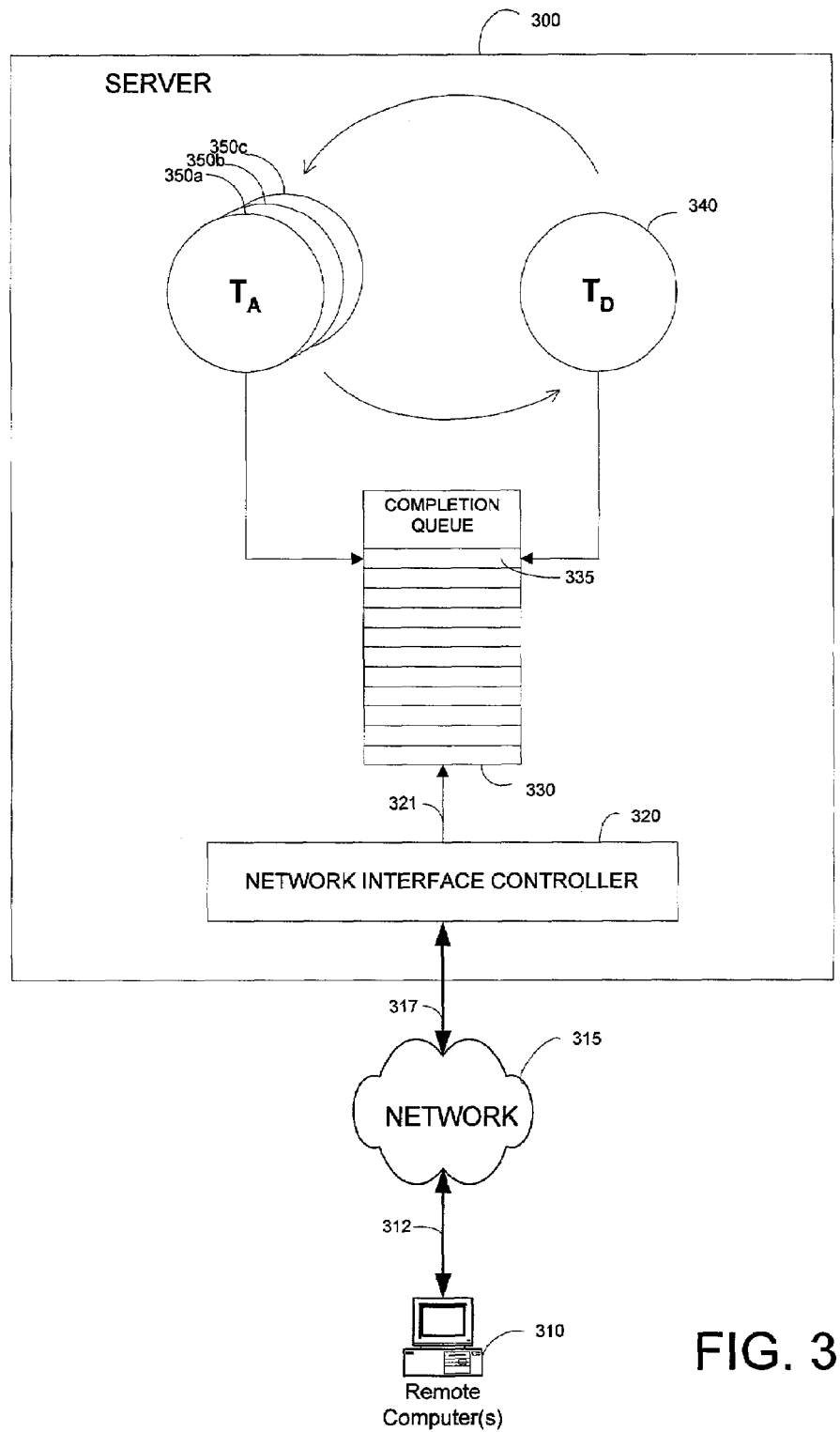
FIG. 3 is a schematic diagram of exemplary server employing IO completion in which aspects of the present invention and/or portions thereof may be incorporated.

Having described an exemplary computing environment for executing a method for network protocol processing in a computer system embodying the present invention, attention is directed to FIG. 3 that depicts an exemplary networked server environment within which the present invention is practiced. As depicted in FIG. 3, a server 300 includes a network interface controller (NIC) 320 connected via data link 312, 317 and network 315 to remote computer(s) 310. The NIC 320 is communicably coupled to a completion queue (CQ) 330 via data link 321. When data transfer operations are posted to the NIC, completion information for these operations is posted to the completion queue 330.

As data transfer operations are completed by the NIC 320, descriptor information identifying the completed data transfer operation is posted on the completion queue 330. Descriptor information includes a tag (i.e., number) that uniquely identifies the completed data transfer operation, an indicator that identifies whether the data transfer operation completed successfully and, if completed successfully, the number of bytes of data transferred. Thereafter, the CQ completions are read and processed by executing threads running in the computer system 300. According to the present invention, application threads $T_A$ 350a–c and dedicated thread $T_D$ 340 work together to perform network protocol processing. According to the invention, the dedicated thread $T_D$ 340 is an executing thread responsive to the status of the completion queue 330.

In one embodiment of the present invention, application threads $T_A$ 350a–c are used as a default to process the CQ completions in the completion queue 330. A method monitors performance of the multiprocessor system to detect whether poor processor utilization or excessive context switches occurs, in which case the dedicated thread $T_D$ 340 is used to process CQ completions. When the operating system context switches to the dedicated thread $T_D$ 340, the dedicated thread $T_D$ 340 sets its priority to a HIGH priority level. The dedicated thread $T_D$ 340 then processes the CQ completions in the completion queue 330 one-by-one beginning with the first CQ completion 335 in the completion queue 330. Running at the HIGH priority level ensures that the dedicated thread $T_D$ 340 will not be preempted prematurely before it has completed some amount of work, thereby reducing number of context switches.

Once the completion queue 330 is empty or a set number of completions are processed, the priority level of the dedicated thread $T_D$ 340 is set to a LOW priority level and the operating system context switches to one of the application threads $T_A$ 350a–c. Thereafter, application threads $T_A$ 350a–c resume execution. As the application threads $T_A$ 350a–c make certain procedure calls to perform network operations, the procedure calls are hijacked to perform network processing. Each time an application thread $T_A$ 350a–c is hijacked, a set number of CQ completions are processed. This ensures that the hijack duration is limited and application threads $T_A$ 350a–c perform application tasks. If one or more application tasks $T_A$ 350a–c block for whatever reason and free CPU cycles become available, the operating system context switches to the dedicated thread $T_D$ 340, thus, allowing the dedicated thread $T_D$ 340 to resume processing completions. The dedicated thread $T_D$ 340 immediately raises its priority to the HIGH level and the entire cycle repeats.

In one embodiment of the invention, the LOW priority level assigned to the dedicated thread $T_D$ 340 is determined based upon the priority levels of the application threads $T_A$ 350a–c in the system. In this embodiment, a sample set of base priorities is determined by analyzing system calls performed by the application threads $T_A$ 350a–c. If all priorities in the sample are identical, the LOW priority level is set to that identical value. If all priorities in the sample are not the same, the LOW priority level is set to a level representative of a percentile in the sample. In one embodiment, the percentile range is between sixty and seventy percent.

Figure 4:
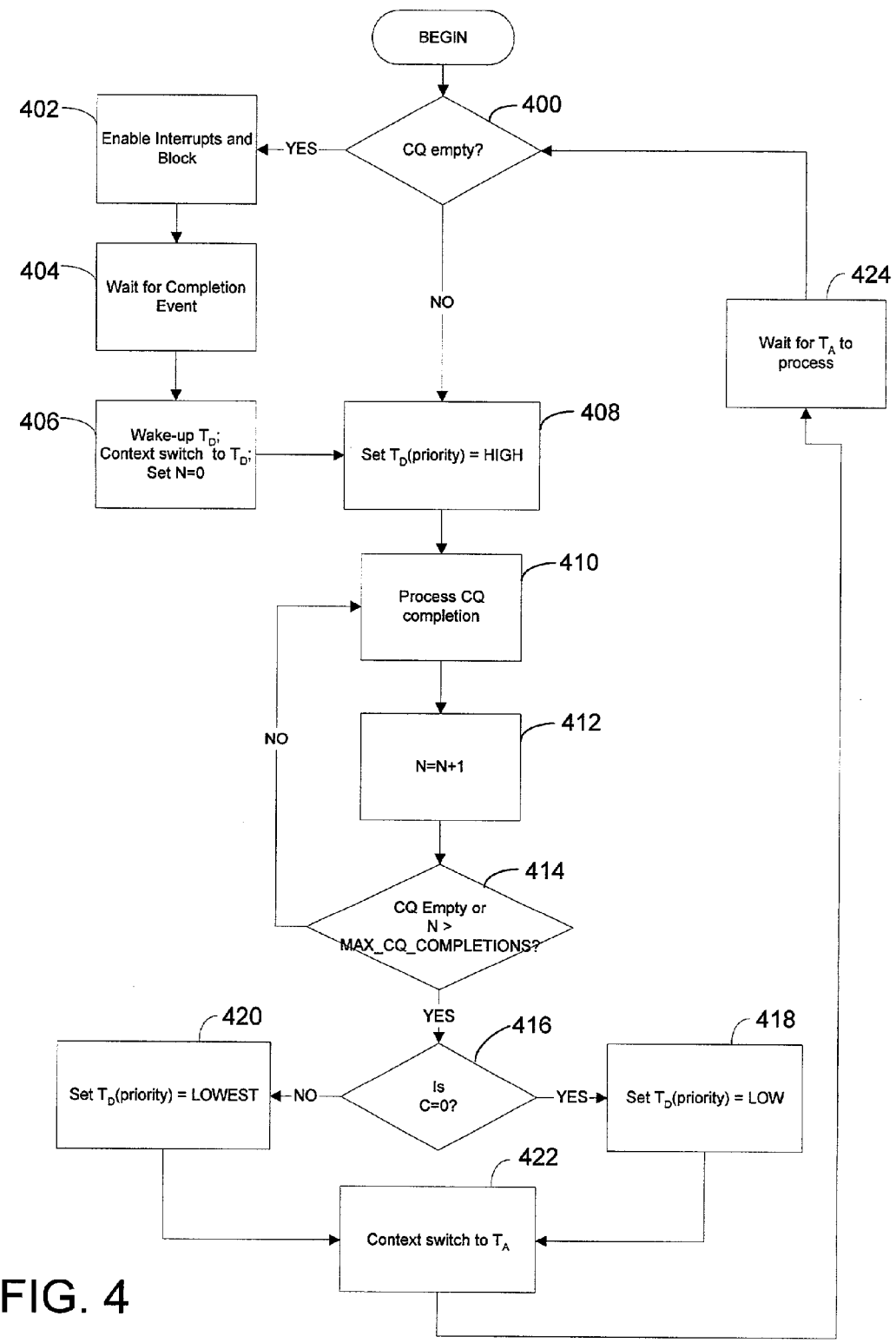
FIG. 4 is a flowchart depicting steps performed by a dedicated thread processing IO completions in accordance with the present invention.

Having described the structures that support an exemplary IO completion technique embodying the present invention, attention is now directed to FIG. 4 that depicts a set of steps performed by a dedicated thread 340 processing IO completions in conjunction with application threads $T_A$ 350a–c in a server 300. The steps described herein below are exemplary. As those skilled in the art will readily appreciate, the present invention can be carried out in a variety of manners and the steps described herein below can be rearranged and modified in accordance with alternative embodiments of the present invention.

The procedure begins at step 400 where the dedicated thread $T_D$ 340 polls the completion queue to determine whether the completion queue 330 is empty. If the completion queue is empty, at step 402 the dedicated thread $T_D$ 340 enables interrupts and blocks. Thereafter, at step 404 the dedicated thread $T_D$ 340 waits for generation of a CQ completion event by the completion queue 330. The generation of a CQ completion event indicates that either a send/receive operation or RDMA read/write operation was completed and a descriptor was added to the completion queue 330. Once a CQ completion event is generated by the completion queue 330, the process moves to step 406 where the dedicated thread $T_D$ 340 wakes up and a context switch is made by a processor to the dedicated thread $T_D$ 340. The processor is chosen by the operating system thread scheduler in a manner that optimizes load-balancing within the multiprocessor system. After the context switch is made to the dedicated thread $T_D$ 340, a counter N is set to zero in step 406. The counter N is reset every time dedicated thread $T_D$ 340 is activated after enabling interrupts and blocking.

After steps 402 through 406 are completed or if the completion queue 330 is not empty as determined in step 400, execution proceeds to step 408 and the priority of dedicated thread $T_D$ 340 is set to a HIGH priority level. When using the Microsoft Windows® operating system, a SetThreadPriority( ) API call is made setting the thread priority to THREAD_PRIORITY_TIME_CRITICAL. Next, at step 410, the dedicated thread $T_D$ 340 reads and processes the first descriptor 335 in the completion queue 330. At step 412, the counter N is increment by one and at step 414, a determination is made whether the completion queue 330 is empty. If the completion queue 330 is not empty, the process returns to step 410 where another descriptor is read and processed by the dedicated thread $T_D$ 340. The process loops from step 410 through step 414 until the completion queue 330 is empty indicating that all descriptors have been processed.

In an alternative embodiment of the present invention, at step 414 the counter N is compared to a constant MAX_CQ_COMPLETIONS. The constant MAX_CQ_COMPLETIONS is selected to limit the number of completions processed by the dedicated thread $T_D$ 340 at the HIGH priority level in order to achieve proper load balancing. In one embodiment, the constant MAX_CQ_COMPLETIONS is set in the range of thirty to forty completions.

When the completion queue is deemed empty or in excess of MAX_CQ_COMPLETIONS at step 414, the process moves on to set the priority of the dedicated thread $T_D$ 340 in order to optimize use of the application threads $T_A$ 350a–c. At step 416, a determination is made whether a global flag C is equal to zero. In one embodiment of the invention, global flag C depends on the number of IO completions processed by the dedicated thread $T_D$ 340 as determined in step 412. If the counter N as determined in step 412 exceeds an optimal number, then global flag C is set to zero and the dedicated thread $T_D$ 340 processes all the IO completions. For example, if counter N exceeds two hundred and fifty, then global flag C is set to zero. Alternatively, if the counter N is low (i.e., below a set threshold in the range of fifty to sixty), this indicates frequent blocking of the dedicated thread $T_D$ 340. In the case of frequent blocking, global flag C is set to a non-zero value, thus, engaging the application threads $T_A$ 350a–c to process IO completions.

If global flag C is equal to zero as determined in step 416, dedicated thread $T_D$ 340 is set to a LOW priority level at step 418. If global flag C is not equal to zero, dedicated thread $T_D$ 340 is set to a LOWEST priority level at step 420. The LOW and LOWEST priority levels are determined based on an analysis of the priority levels of the application threads $T_A$ 350a–c running in the system 300. Determination of the LOW and LOWEST priority levels is described below in conjunction with FIG. 6. Lowering the priority level of the dedicated thread $T_D$ 340 results in a context switch to one of the application threads $T_A$ 350a–c. Setting the priority level to LOWEST ensures that the application threads $T_A$ 350a–c are given the opportunity to process IO completions, and prevents unnecessary scheduling of the dedicated thread $T_D$ 340 and costly context switches.

At step 422, a context switch is made to the application thread $T_A$ 350a–c. At step 424, the application threads $T_A$ 350a–c perform various application tasks including processing CQ completions (as discussed below). Eventually, one or more application threads $T_A$ 350a–c block or are preempted by the operating system scheduler, and the operating system scheduler schedules the dedicated thread $T_D$ 340 for execution. Thereafter, the process returns to step 400 where the completion queue 330 is polled by the dedicated thread $T_D$ 340 to identify entries for processing.

Figure 5:
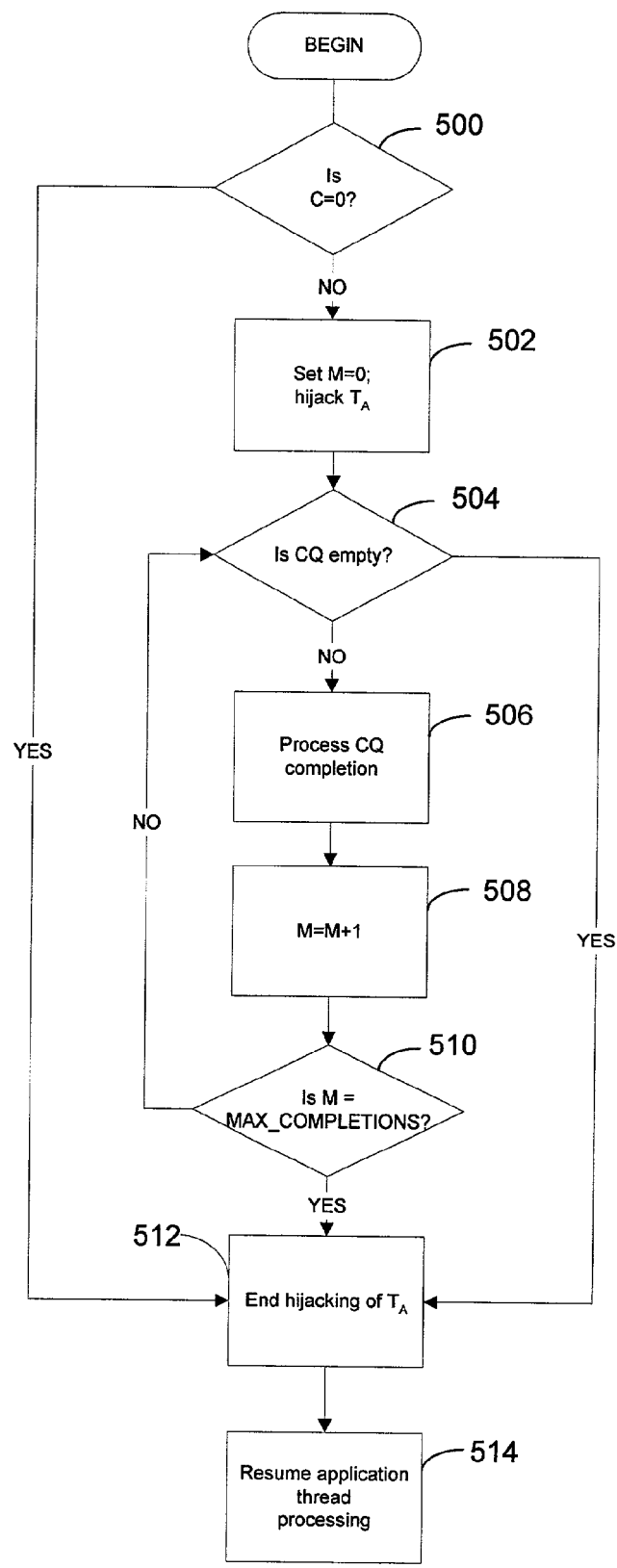
FIG. 5 is a flowchart depicting steps performed by a network protocol stack processing IO completions in accordance with the present invention.

Attention is now directed to FIG. 5 that depicts a set of steps performed by the network protocol stack as it hijacks a procedure call made by application threads $T_A$ 350a–c for processing IO completions as depicted in step 424. The steps described herein below are exemplary. The procedure begins at step 500 in FIG. 5 wherein global flag C is checked to determine whether application threads $T_A$ 350a–c should be used to process IO completions. If global flag C is equal to zero, the process skips ahead to step 512 and application threads $T_A$ 350a–c are not used for processing IO completions because it would lead to poor load balancing in multiprocessor systems. If global flag C is not equal to zero, at step 502 a counter M is set to zero and the network protocol stack proceeds to use the hijacked application thread $T_A$ 350a–c for processing IO completions.

Thereafter, at step 504, the application thread $T_A$ 350a checks the completion queue 330 for entries. If the completion queue 330 is empty, there is no work to be done and the process proceeds directly to step 512. Otherwise, if the completion queue 330 is not empty, at step 506 the process reads and processes the first descriptor 335 in the completion queue 330. At step 508, the counter M is increment by one and the process continues to step 510 where a determination is made whether counter M is equal to a constant MAX_COMPLETIONS. The constant MAX_COMPLETIONS is selected in order to achieve optimal load-balancing amongst the processors in the multiprocessor server 300. In one embodiment of the invention, the constant MAX_COMPLETIONS is set to three or four so that the application thread $T_A$ 350a reads and processes three or four completions every time the thread is hijacked.

With continued reference to FIG. 5, the process loops from step 504 through step 510 until either the completion queue 330 is empty as determined in step 504 or the counter M reaches MAX COMPLETIONS as determined in step 510. Then, at step 512 hijacking of application thread $T_A$ 350a ends and the application thread $T_A$ 350a is allowed to resume other processing related to the application in step 514.

Figure 6:
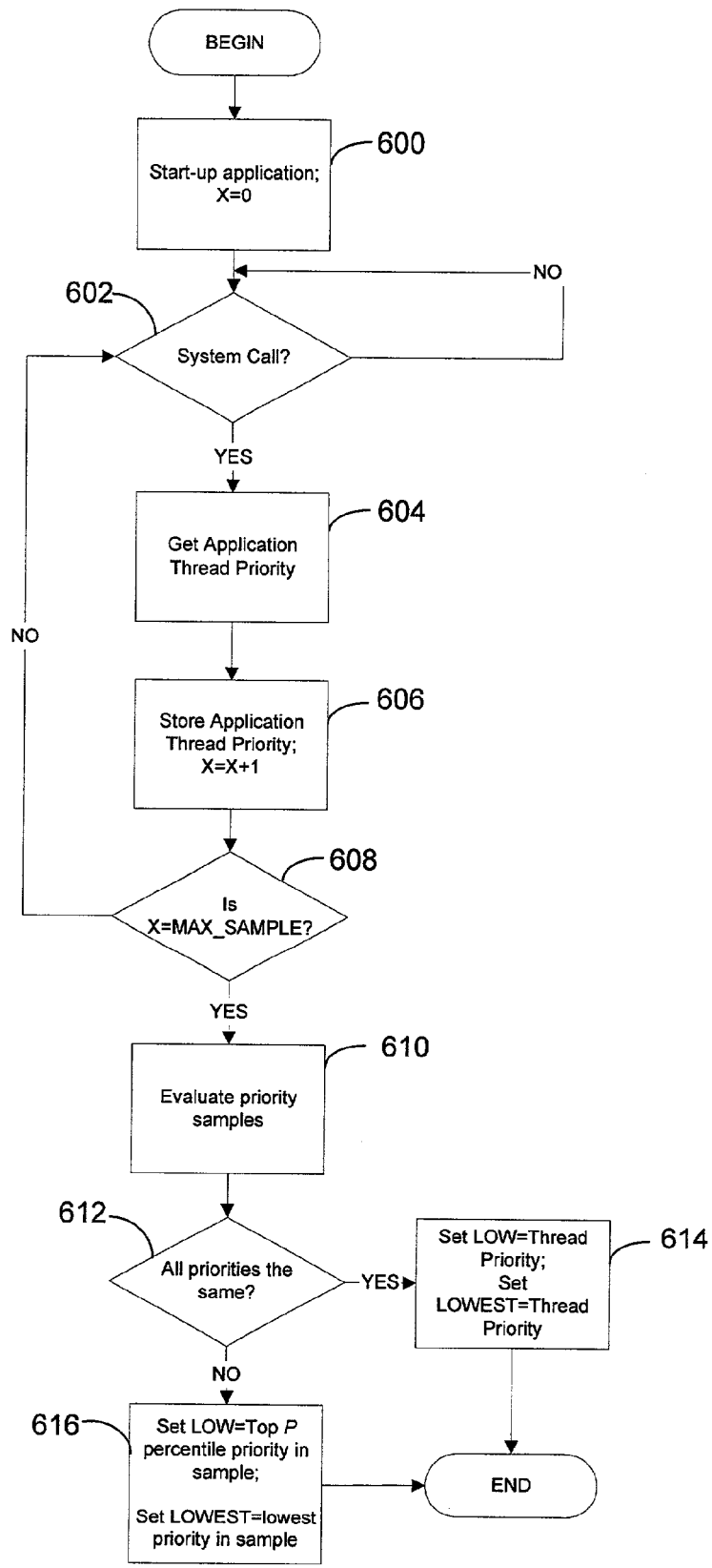
FIG. 6 is a flowchart depicting steps performed by a server when assigning a priority level to a dedicated thread processing IO completions in a multiprocessor system in accordance with the present invention.

Attention is now directed to FIG. 6 that depicts a set of steps performed by a server when assigning a priority level to a dedicated thread processing IO completions in a multiprocessor system in accordance with the present invention. The steps described herein below are exemplary. The procedure begins at step 600 in FIG. 6 wherein an application is started and a counter X is set to zero. As the application runs invoking data transfer calls, at step 602, a determination is made whether the any calls made by the application thread $T_A$ 350a are system calls. In one embodiment of the invention, when using the Microsoft Windows® operating system, the process determines whether a WSPSend( ) API call is invoked by the application thread $T_A$ 350a.

If the call is a system call, at step 604 the priority of application thread $T_A$ 350a is determined. When using the Microsoft Windows® operating system, a GetThreadPriority( ) API call is invoked to determine the thread priority. At step 606, the thread priority is stored in memory for later analysis and the counter X is incremented by one. At step 608, a determination is made whether counter X is equal to the constant MAX_SAMPLE. The constant MAX_SAMPLE is selected in order to obtain an adequate sample to determine the average priority level of the send calls. In one embodiment of the invention, the constant MAX_SAMPLE is set between fifty and one-hundred.

With continued reference to FIG. 6, the process loops from step 602 through step 608 until the counter M reaches MAX_SAMPLE. Then, at step 610 the priority levels stored in step 606 are evaluated to determine the LOW and LOWEST priority settings. At step 612, a determination is made whether the sampling of priorities reveals that all priority levels measured are identical. If the priority levels are identical, at step 614 the LOW and LOWEST priority levels are set to that identical priority level. In one embodiment of the present invention, if the identical priority level is lower than a predetermined minimum priority level, the LOW and LOWEST priority levels are set to the predetermined minimum priority level. When using the Microsoft Windows® operating system, the predetermined minimum priority level is THREAD_PRIORITY_BELOW_NORMAL.

If the priority levels are not the same, at step 616 the LOWEST priority level is set to the lowest priority in the sample set and the LOW priority level is set to a percentile of the sample set. In one embodiment of the present invention, if the top seventy percent of the samples have a priority Y and the remaining thirty percent have a priority lower than Y, then the LOW priority level is set to Y. In another embodiment of the present invention, if the LOW priority level and/or LOWEST priority level are lower than a predetermined minimum priority level, the LOW and/or LOWEST priority levels are set to the predetermined minimum priority level. When using the Microsoft Windows® operating system, the predetermined minimum priority level is THREAD_PRIORITY_BELOW_NORMAL.

With continued reference to FIG. 6, the process ends after the LOW and LOWEST priority levels are set in either step 614 or 616. The process of analyzing send calls and determining the LOW and LOWEST priority levels repeats after a set number of CQ completions are posted to the completion queue 330. In one embodiment of the present invention, the process repeats after every fifty thousand CQ completions are posted to the completion queue 330.

Illustrative embodiments of the present invention and certain variations thereof have been provided in the Figures and accompanying written description. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A method for adaptively processing completions of data transfer operations in a server comprising a network interface communicably coupled to perform the data transfer operations, a completion queue storing completion information for the data transfer operations, a set of executing threads capable of processing the completion information, the set of executing threads comprising a dedicated thread having a priority level responsive to a status of the completion queue, and wherein an application thread is coupled to an application running on the server to process application system calls, the method comprising the steps of: first processing, by the set of executing threads, the completion information in the completion queue according to a first priority level of the dedicated thread; determining a change in status of the completion queue and in response assigning a second priority level to the dedicated thread; and second processing, by the set of executing threads, the completion queue in the completion queue according to the second priority level of the dedicated thread.

2. The method of claim 1 wherein the set of executing threads further comprises the application thread.

3. The method of claim 2 wherein the completion information comprises one or more entries in the completion queue, each entry uniquely identifying a data transfer operation completed by the network interface.

4. The method of claim 3 wherein the first processing step comprises the steps of: reading the entries in the completion queue; increasing a counter by one for each entry read, the counter tracking the number of entries processed by the executing threads; and processing the entries.

5. The method of claim 2 wherein the application thread includes a priority level, the method further comprising the step of determining a base priority level for the application thread.

6. The method of claim 5 wherein the step of determining the base priority level comprises the steps of: collecting a sample set of priority levels for the application thread invoking system calls; and analyzing the sample set to determine the base priority level.

7. The method of claim 6 wherein the system calls comprise send calls invoked by the application.

8. The method of claim 6 wherein the step of analyzing the sample set comprises the conditionally executed steps of: comparing the priority levels in the sample set to each other; setting the base priority level to a level equal to one of the priority levels in the sample set if the priority levels in the sample set are identical; and otherwise setting the base priority level to the level equal to a percentile of the sample set if the priority levels in the sample set are not identical.

9. The method of claim 8 wherein the percentile of the sample represents the largest percentile of identical priority levels in the sample set.

10. The method of claim 3 wherein a set of potential statuses for the completion queue include: an empty completion queue, and the completion queue includes a number of pending entries that exceeds a specified number and wherein the determining a change in status step comprises the steps of: discontinuing processing the completion information in the completion queue; and assigning the second priority level to the dedicated thread.

11. The method of claim 10, wherein processing of completion entries during the first processing is performed solely by the dedicated thread and processing of completion entries during the second processing is performed by the application thread without assistance from the dedicated thread, wherein assigning the second priority level step comprises the steps of: setting the priority level of the dedicated thread to the base priority level; and comparing the priority level of the dedicated thread to the priority level of the application thread and in response to determining that the application thread priority level is higher than the dedicated thread priority level context switching to the application thread.

12. The method of claim 10 wherein processing of completion entries during the first processing is performed solely by the application thread and processing of completion entries during the second processing is performed by the dedicated thread without assistance from the application thread, wherein assigning the second priority level step comprises the steps of: setting the priority level of the dedicated thread to a high priority level; and comparing the priority level of the dedicated thread to the priority level of the application thread and in response to determining that the dedicated thread priority level is higher than the application thread priority level context switching to the dedicated thread.

13. The method of claim 12 wherein the high priority level is higher than the base priority level.

14. The method of claim 13 wherein the high priority level is equal to THREAD_PRIORITY_TIME_CRITICAL.

15. A computer-readable medium having computer-executable instructions for facilitating adaptively processing completions of data transfer operations in a server comprising a network interface communicably coupled to perform the data transfer operations, a completion queue storing completion information for the data transfer operations, a set of executing threads capable of processing the completion information, the set of executing threads comprising a dedicated thread having a priority level responsive to a status of the completion queue, and wherein an application thread is coupled to an application running on the server to process application system calls, the computer-readable medium having computer-executable instructions facilitating performing the steps of: first processing, by the set of executing threads, the completion information in the completion queue according to a first priority level of the dedicated thread; determining a change in status of the completion queue and in response assigning a second priority level to the dedicated thread; and second processing, by the set of executing threads, the completion queue in the completion queue according to the second priority level of the dedicated thread.

16. The computer-readable medium of claim 15 wherein the set of executing threads further comprises the application thread.

17. The computer-readable medium of claim 16 wherein the completion information comprises one or more entries in the completion queue, each entry uniquely identifying the data transfer operation completed by the network interface.

18. The computer-readable medium of claim 17 comprising further computer-executable instructions facilitating performing the steps of: reading entries in the completion queue; increasing a counter by one for each entry read, the counter tracking the number of entries processed by the executing threads; and processing the entries.

19. The computer-readable medium of claim 16 wherein the application thread includes a priority level, the computer-readable medium comprising further computer-executable instructions facilitating performing the step of determining a base priority level for the application thread.

20. The computer-readable medium of claim 19 wherein the computer-executable instructions facilitating performing the step of determining the base priority level comprises computer-executable instructions facilitating performing the steps of: collecting a sample set of priority levels for the application thread invoking system calls; arid analyzing the sample set to determine the base priority level.

21. The computer-readable medium of claim 20 wherein the system calls comprise send calls invoked by the application.

22. The computer-readable medium of claim 20 wherein the computer-executable instructions facilitating performing the step of analyzing the sample set comprises computer-executable instructions facilitating performing the conditionally executed steps of: comparing the priority levels in the sample set to each other; setting the base priority level to a level equal to one of the priority levels in the sample set if the priority levels in the sample set are identical; and otherwise setting the base priority level to the level equal to a percentile of the sample set if the priority levels in the sample set are not identical.

23. The computer-readable medium of claim 22 wherein the percentile of the sample represents the largest percentile of identical priority levels in the sample set.

24. The computer-readable medium of claim 17 wherein a set of potential statuses for the completion queue include: an empty completion queue, and the completion queue includes a number of pending entries that exceeds a specified number and wherein the computer-executable instructions facilitating determining a change in status comprises computer-executable instructions facilitating performing the steps of: discontinuing processing the completion information in the completion queue; and assigning the second priority level to the dedicated thread.

25. The computer-readable medium of claim 24, wherein processing of completion entries during the first processing is performed solely by the dedicated thread and processing of completion entries during the second processing is performed by the application thread without assistance from the dedicated thread, wherein the computer-executable instructions facilitating assigning the second priority level comprises computer-executable instructions facilitating performing the steps of: setting the priority level of the dedicated thread to the base priority level; and comparing the priority level of the dedicated thread to the priority level of the application thread and in response to determining that the application thread priority level is higher than the dedicated thread priority level context switching to the application thread.

26. The computer-readable medium of claim 24 wherein processing of completion entries during the first processing is performed solely by the application thread and processing of completion entries during the second processing is performed by the dedicated thread without assistance from the application thread, wherein the computer-executable instructions facilitating assigning the second priority level step comprises computer-executable instructions facilitating performing the steps of: setting the priority level of the dedicated thread to a high priority level; and comparing the priority level of the dedicated thread to the priority level of the application thread and in response to determining that the dedicated thread priority level is higher than the application thread priority level context switching to the dedicated thread.

27. The computer-readable medium of claim 26 wherein the high priority level is higher than the base priority level.

28. The computer-readable medium of claim 27 wherein the high priority level is equal to THREAD_PRIORITY_TIME_CRITICAL.

29. An IO completion framework in a computer system for adaptively processing completion entries in a completion queue, the framework comprising: a network interface for receiving and enqueueing the completion entries in the completion queueing and a set of executing threads comprising: at least a dedicated thread, the dedicated thread having a priority attribute; and a monitor for setting the priority attribute in accordance with a status of the completion queue;

wherein the executing threads include at least one application thread; and wherein the monitor comprises: a counter for tabulating the number of completion entries processed by the executing thread; an indicator signaling that the completion queue is empty; a base priority level indicative of priority levels for the system calls invoked by the application; and a high priority level higher than the base priority level.

30. The framework of claim 29 wherein each completion entry uniquely identifies the data transfer operation completed by the network interface.

31. The framework of claim 29 wherein the statuses of the completion queue include: an empty completion queue; and the completion queue includes a number of pending entries that exceeds a specified number.

* * * * *

UNITED STATES PATENT AND TRADEMARK OFFICE
CERTIFICATE OF CORRECTION

PATENT NO. : 6,988,268 B2  Page 1 of 1
APPLICATION NO. : 10/137589
DATED : January 17, 2006
INVENTOR(S) : Khawar M. Zuberi It is certified that error appears in the above-identified patent and that said Letters Patent is hereby corrected as shown below:

On the title page, item (56), under "Other Publications", in column 2, line 5, delete "barve" and insert -- Barve --, therefor.

On page 2, item (56), under "Other Publications", in column 1, line 7, delete "(ODSI )" and insert -- (ODSI) --, therefor.

In column 9, line 11, delete "MAX COMPLETIONS" and insert -- MAX_COMPLETIONS --, therefor.

In column 12, line 24, in Claim 20, delete "arid" and insert -- and --, therefor.

In column 14, line 1, in Claim 29, delete "queueing" and insert -- queue; --, therefor.

Signed and Sealed this

Twenty-third Day of March, 2010

David J. Kappos
*Director of the United States Patent and Trademark Office*